UNITED STATES PATENT OFFICE.

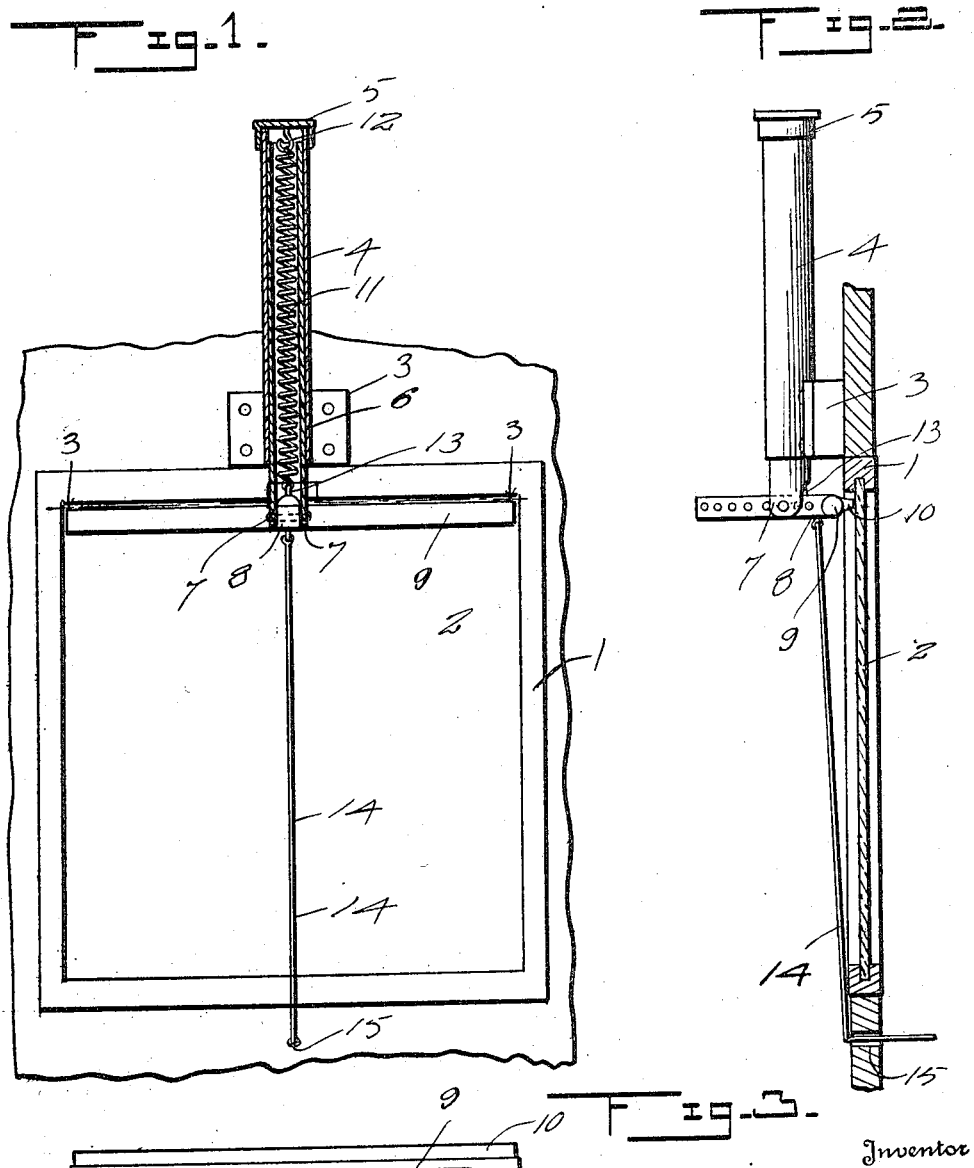

HARRY M. MONTOOTH, OF NEWARK, NEW JERSEY.

DEVICE FOR CLEANING WINDOWS OR WIND-SHIELDS.

1,267,249.

Specification of Letters Patent.

Patented May 21, 1918.

Application filed August 10, 1917. Serial No. 185,503.

*To all whom it may concern:*

Be it known that I, HARRY M. MONTOOTH, a citizen of the United States, residing at Newark, in the county of Essex and State of New Jersey, have invented certain new and useful Improvements in Devices for Cleaning Windows or Wind-Shields; and I do hereby declare the following to be a full, clear, and exact description of the invention, such as will enable others skilled in the art to which it appertains to make and use the same.

This invention relates to improvements in a device for cleaning windows or windshields and has for one of its objects the provision of a device of this character, whereby rain and other foreign matter may be readily removed from the window or windshield whenever desired.

Another object of this invention is the provision of a cleaning member slidably supported in close proximity to the window or windshield so that upon movement of the cleaner, foreign matter will be removed from the glass of the window or windshield.

A further object of this invention is the provision of means for returning the cleaning member to its normal position after being moved upon its operative stroke, and when returning to its normal position is automatically disengaged from the glass of the windshield or window.

A still further object of this invention is the provision of a device for cleaning windows or windshields of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a front elevation partly in section of a device for cleaning windows or windshields constructed in accordance with my invention, Fig. 2 is a side elevation of the same, Fig. 3 is a detail view taken on the line 3—3 of Fig. 1.

Referring to the drawing, the numeral 1 indicates the frame of a window or windshield, which has mounted therein, a glass 2.

A supporting bracket 3 is secured to the window frame or the frame of the windshield 1 and has secured thereto, a cylindrical member 4, which has its upper end closed by a removable cap 5.

A hollow member 6 is slidably mounted in the member 4 and has its lower free end reduced to form ears 7 between which is pivoted an arm 8. The arm 8 is provided with a plurality of apertures whereby one end of the arm may be adjusted toward and from the window as desired. A cleaning member 9 is formed upon the arm 8 and has secured thereto, rubber or other suitable material as at 10 for engagement with the glass 2 of the window or windshield. A coiled spring 11 is secured to the cap 5 by means of a hook 12 and has its other end secured to the arm 8 adjacent the cleaning member 9 as shown at 13. An operating cord 14 is secured to the arm 8 adjacent its pivot and extends downwardly in front of the window and passes through an aperture 15 in the frame for supporting the window whereby the cleaner may be pulled downwardly against the tension of the spring 11 over the glass 2, thus removing all foreign matter therefrom. The spring being connected to the arm 8 will return the cleaning member 9 to its initial position when the cord 14 is released and as the spring exerts a pull on the arm 8 it will rock the same on its pivot which moves the cleaner from engagement with the glass as it moves upwardly.

While I have shown and described the preferred embodiment of my invention, it will be understood that minor changes in construction, combination and arrangement of parts may be made without departing from the spirit and scope of the invention as claimed.

What is claimed is:

A device of the character set forth comprising a supporting bracket, a cylindrical member carried by said supporting bracket, a cap secured to said cylindrical member, a hollow member slidable in said cylindrical member, an arm pivoted to said hollow member, a cleaner carried by said arm and adapted to engage the window, a coiled spring connected to said arm and to said cap for returning the said cleaner to its normal position, and a cord connected to the arm for moving said cleaner over the window.

In testimony whereof I affix my signature in presence of two witnesses.

HARRY M. MONTOOTH.

Witnesses:
KENNETH C. AUL,
I. LESTER SELVAGE.